Feb. 27, 1940.　　　E. M. MILLER　　　2,191,742
SWITCH OPERATING DEVICE
Filed Dec. 23, 1937
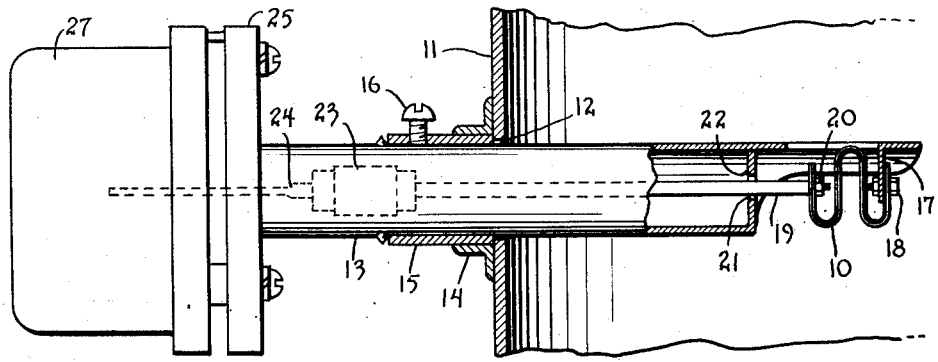
Fig. 1
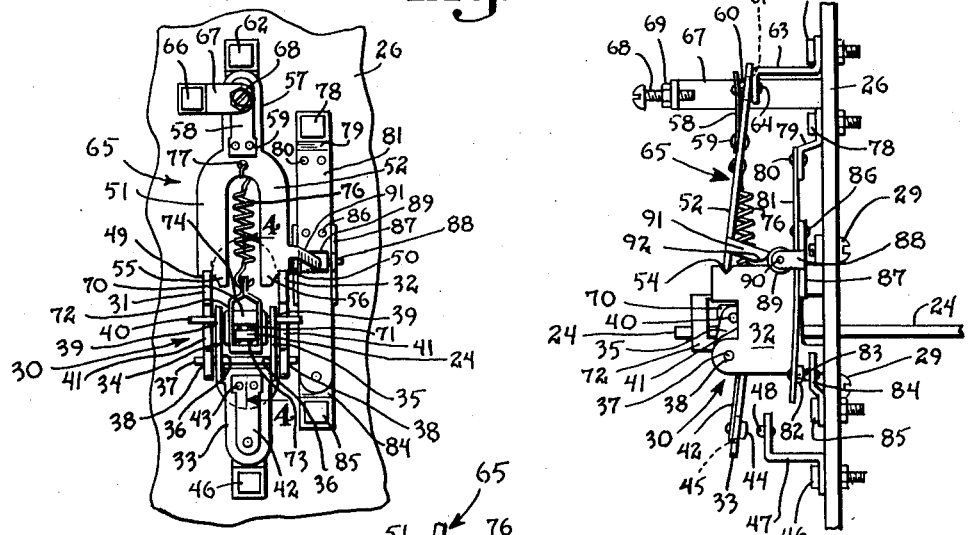
Fig. 2　　　　　　　　　　　　　　　　　Fig. 3
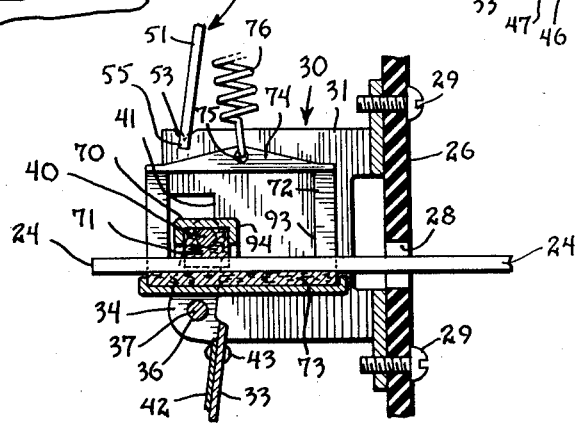
Fig. 4
INVENTOR
Ernest M. Miller
BY
*George H Fiske*
ATTORNEY Patented Feb. 27, 1940

2,191,742

UNITED STATES PATENT OFFICE 2,191,742

SWITCH OPERATING DEVICE

Ernest M. Miller, Excelsior, Minn., assignor to Minneapolis-Honeywell Regulator Company, Minneapolis, Minn., a corporation of Delaware Application December 23, 1937, Serial No. 181,350

17 Claims. (Cl. 200—138)

This invention relates broadly to a switching device, and more particularly to a device which will cause a plurality of switches to operate in a desired sequence.

The present arrangement may be advantageously used to control an oil burner circuit such as disclosed in Figure 5 of my copending application Serial No. 673,265, filed May 27, 1933, on "Fuel burning systems and switching mechanism therefor," but it is not necessarily limited thereto. It may be used in other temperature control systems and might conceivably be used to control conditions other than temperature.

One of the objects of this invention is to provide an improved connection between a condition responsive device and a plurality of switches whereby the switches will be operated in one sequence as the condition varies in one direction, and in the same sequence as the condition varies in the other direction.

Another object is to provide a slip friction connection between the condition responsive device and the switches so that continued movement of said condition responsive means will be permitted after the switches have been operated, and the switches will be reversed a predetermined time after the direction of change of said condition has reversed.

A further object is to provide a separate slip friction connection between the operating connection and one of the switches which connection slips while the other switches are being operated, whereby the first switch is operated immediately upon a reversal in the direction of condition change.

A still further object is to operate a first switch substantially immediately on a condition change, and operate second and third switches a predetermined time thereafter; then to operate said first switch again substantially immediately after a reversal of the condition change and operate the second and third switches a predetermined time thereafter.

Another object of this invention is to provide a switching device of the above type wherein the second and third switches are operated by a snap action mechanism and wherein a slip friction connection is provided between the switch operator and the switches whereby the switches are operated a predetermined time after a reversal in the direction of condition change and are independent of any particular condition value.

A further object is to provide a switch mechanism which is compact as to structure and simple as to design; one which will be cheap to manufacture, and yet which is reliable in operation and which will produce the desired sequence of switch operations.

Further objects will become apparent to those skilled in the art as they study the following specification with reference to the accompanying drawing in which:

Figure 1 is a side elevation, partly in section, showing how the present invention may be connected to a thermostat and mounted in the stack of a furnace;

Figure 2 is a view of the switch mechanism looking to the right in Figure 1 and with the casing removed;

Figure 3 is a side elevation of the switch mechanism looking toward the left in Figure 2; and Figure 4 is a detail sectional view taken along the line 4—4 of Figure 2 and looking in the direction of the arrows.

The switch mechanism of the present invention is shown in Figure 1 as applied to a stack 11 of a furnace (not shown) which is heated by means of an oil burner which the switch mechanism is designed to control. Stack 11 is provided with a hole 12 into which is inserted a hollow tube 13. About the hole 12 is a flanged mounting 14 into which is inserted a sleeve 15 which closely surrounds and supports the tube 13 and which is fastened thereto by means of a screw 16. The inner end of the tube 13 is provided with an inwardly turned projection 17 to which is attached, by means of a bolt and nut 18, one end of a bimetallic element 10 which is generally W-shaped. The other end of the bimetallic element 10 is suitably connected to a rod 19 by means of nut 20 threaded on the end of the rod. The rod 19 extends loosely through a hole 21 in another inturned portion 22 of the tube 13 and is supported and guided thereby. The other end of the rod 19 which extends outside of stack 11 is screw threaded to an insulating member 23 which carries at its other end an operating strip 24.

Suitably mounted on the outer end of the tube 13 is a support 25 which carries a panel 26, shown in Figures 2, 3, and 4, upon which the switch mechanism of the present invention is mounted. A cover 27 is adapted to be placed over the panel to protect the mechanism and to present a pleasing appearance. Inasmuch as this invention concerns only the switching mechanism, the panel 26 has been broken off, as shown in Figures 2, 3, and 4, but it is pointed out that other structure such as a transformer and relays may also be mounted on this panel if desired. The panel 26 is provided with a hole 28 through which the flattened operating strip 24 passes. Mounted on the panel 26 by means of screws 29 is a supporting bracket 30 having two upstanding legs 31 and 32. A lever 33 is provided at one end with two extensions 34 and 35, which are provided with two aligned holes 36 through which passes a spindle 37. Aligned with holes 36 are two more holes 38 provided in each leg of bracket 30. Spindle 37 also passes through these holes and provides a pivot about which lever 33 rotates. Extensions 34 and 35 are provided with two more aligned holes 39 through which is passed a stop arm 40 which is adapted to cooperate with a cut-away portion 41 in each leg of bracket 30 to act as a stop for limiting the rotation of lever 33 in a clockwise direction, as viewed in Figure 3. The other end of lever 33 is provided with a leaf spring 42 which is suitably riveted to the lever, as at 43. At the end of the leaf spring which is opposite the rivets is secured a contact 44 which normally extends through a hole 45 in the lever 33. Secured to the panel 26 by means of a bolt and nut 46 is a bracket 47 which carries a contact 48 which is adapted to cooperate with the contact 44 when the lever 33 is rotated in a counter-clockwise direction, as viewed in Figure 3.

A second lever 65 is provided which is generally Y-shaped and which has knife edges 49 and 50 at the end of two of its legs 51 and 52 which are adapted to seat in depressions 53 and 54 cut in legs 31 and 32, respectively, of the bracket 30. In order that this lever 65 shall not slide latterly out of the depressions 53 and 54, the legs 51 and 52 are provided with extensions 55 and 56. The third leg 57 of lever 65 is provided with a leaf spring 58 which is suitably riveted thereto, as shown at 59. The leaf spring carries at its outer end a contact 60 which normally projects downwardly through a hole 61 cut in the leg 57.

Fastened to panel 26 by means of bolt and nut 62 is a bracket 63 carrying at its upper end a stationary contact 64 which is adapted to cooperate with contact 60 as the Y-shaped lever 65 is rotated in a clockwise direction, as viewed in Figure 3. Also mounted on panel 26 by means of bolt and nut 66 is another bracket 67 which is provided at its upper end with a screw 68 and lock nut 69, the purpose of which is to act as an adjustable stop to limit the rotation of lever 65 in a counter-clockwise direction, as viewed in Figure 3.

The end of lever 33 which carries the stop arm 40 is provided with a channel shaped member 70 which carries suitable material 71 for providing a slip friction connection with the operating strip 24. The material 71 providing the slip friction may be cork impregnated with graphite or any material which will produce the proper amount of friction with the strip 24. The member 70 is provided with holes through which the stop arm 40 is passed and it is therefore supported by said arm and also by the strip 24.

Nesting within the channel shaped member 70 and engaging the other side of the strip 24 is a control member 72 which also carries a suitable slip friction material 73 which may also be cork impregnated with graphite. The side of member 72 opposite that which carries the slip friction material 73 is provided with an extension 74 having a small hole 75 in which is hooked one end of a spring 76, the opposite end of which is hooked into a small hole 77 of the lever 65. The spring 76 is a tension spring and lies between the legs 51 and 52 of the lever 65 and is adapted to produce a snap action thereof. Suitably attached to the panel 26 as by means of a bolt and nut 78 is a bracket 79 to which is riveted, as at 80, a leaf spring 81 carrying at its free end a contact 82. The contact 82 is adapted to cooperate with a stationary contact 83 mounted on a bracket 84 which is bolted to panel 26 by means of bolt and nut 85. Secured by means of rivets 86 to the center of the leaf spring is a member 87 having two upstanding arms 88 between which a roller 89 is pivoted by means of a pin 90. Extending downwardly from leg 52 of lever 65 is an arm 91 having a rounded end 92 which is adapted to engage the roller 89 upon movement of lever 65 in a clockwise direction which will depress the leaf spring 81 and cause contacts 82 and 83 to close.

As set forth in the objects of invention, one of the uses to which this device may be put is the control of an oil burner. In the circuit disclosed in Figure 5 of my copending application Serial No. 673,265, filed May 27, 1933, there is shown a switch which is to be closed immediately after ignition takes place, ignition being detected by a thermostat. The purpose of this switch is to shunt out the electric heater for the safety switch. This corresponds to switch 44—48 of the present application. Next there are shown two switches which are opened after the aforementioned switch is closed; one is the switch which controls the ignition circuit which is switch 82—83 of the present application, and the other is the cold switch which prevents the burner motor being started after the system has been shut down for any reason without first energizing the ignition circuit. This is switch 60—64 of the present application.

Assuming now that the oil burner is shut down and the gases in stack 11 are cold, the switch mechanism will be in the position shown more clearly in Figure 3. Assume now that the room thermostat calls for heat and that ignition takes place in the burner, the hot gases passing up the stack will cause the thermostat to expand and move the strip 24 to the left. Due to the frictional engagement between the strip 24 and member 70 carried by the lever 33, this lever will be rotated in a counter-clockwise direction which will close the contacts 44 and 48. Any further movement of strip 24 to the left will merely cause a slip between the slip friction material 71 and the strip and the lever 33 will remain in switch closed position. Also as the strip 24 moves to the left, it will carry with it the control member 72 which is connected to one end of the snap spring 76. As the strip 24 continues to move to the left, it will eventually cause the end of the spring 76 carried by said member to pass beyond the knife edges 49 and 50 on which the lever 65 is pivoted, at which time it will produce a snap of the lever 65 in a counter-clockwise direction into engagement with the stop 68. This will open the contacts 60 and 64 and also raise the arm 91 from engagement with the roller 89 permitting the leaf spring 81 to flex to the left and break the contacts 82 and 83. The movement of member 72 to the left will be limited by the engagement of the edge 93 with the lower edge 94 of member 70. Any further movement to the left of the strip 24 will be taken care of by the slip friction connection 73.

When the room thermostat becomes satisfied and opens the circuit to the burner motor, the flame will be extinguished and the gases passing through the stack 11 will cool, which will cause the thermostat to contract and move strip 24 to the right. Lever 33 will be rotated immediately in a clockwise direction causing the contacts 44 and 48 to separate. This rotation will be stopped by the engagement of the stop arm 40 with the cut-away portion 41 on the bracket 30. Further movement of the strip 24 to the right is taken care of by the slip friction connection 71. Also as the strip 24 moves to the right, it carries with it the member 72 which lowers the spring 76 until it passes beyond the knife edges 49 and 50, at which time the spring will cause the lever 65 to snap in a clockwise direction which will cause the engagement of the contacts 60 and 64 and which will also cause the arm 91 to engage the roller 89 thereby depressing the leaf spring 81 and causing engagement of the contacts 82 and 83. Movement of member 72 to the right is limited by engagement with the upper edge of member 70. Any further movement of the strip 24 to the right is taken care of by the slip friction connection 73.

Thus it will be seen that the present switch mechanism depends not upon any definite temperatures to operate the various switches but depends rather upon a change in temperature. It will be noted also that on an increase in temperature, switch 44—48 is operated first and then the switches 60—64 and 82—83 are operated a predetermined time thereafter and with a snap action. It will be noted also that upon a decrease in temperature, the switch 44—48 is again the first one to operate and that the switches 60—64 and 82—83 are operated a predetermined time thereafter with a snap action.

The leaf spring 42 on lever 33 and leaf spring 58 on leg 57 of the lever 65 are provided in order to assure a uniform contact pressure in the switches.

It will, therefore, be seen that I have provided a switch mechanism which operates a series of switches in a desired sequence and which is comparatively simple and dependable in operation. Various modifications of this invention will doubtless occur to those skilled in the art, and therefore it is to be distinctly understood that I am to be limited not by the specific disclosure herein set forth but rather by the scope of the appended claims.

I claim as my invention:

1. A switch mechanism comprising in combination, a condition responsive device, an operating member connected thereto, a first switch, slip friction means connecting said switch to said operating member, stops for limiting the movement of said switch, a second switch, a third switch, and means connecting said second and third switches to said operating member comprising a single snap action mechanism.

2. A switch mechanism comprising in combination, a condition responsive device, an operating member connected thereto, a first switch, slip friction means connecting said switch to said operating member, stops for limiting the movement of said switch, a second switch, a third switch, and means connecting said second and third switches to said operating member comprising snap action mechanism wherein the movement of the operating member necessary to cause operation of said snap action mechanism is greater than that required to move said first switch through its entire range of movement.

3. A switch mechanism comprising in combination, a condition responsive device, an operating member connected thereto, a first switch, slip friction means connecting said switch to said operating member, stops for limiting the movement of said switch, a second switch, a third switch, snap action mechanism for operating said switches, and a slip friction means connecting said snap action mechanism to said operating member.

4. A switch mechanism comprising in combination, a condition responsive device, an operating member connected thereto, a first switch, slip friction means connecting said switch to said operating member, stops for limiting the movement of said switch, a second switch, a third switch, snap action mechanism for operating said switches, and a slip friction means connecting said snap action mechanism to said operating member wherein the movement of the operating member necessary to cause operation of said snap action mechanism is greater than that required to move said first switch through its entire range of movement.

5. A switch mechanism comprising in combination, a condition responsive device, an operating member connected thereto, a first switch, slip friction means connecting said switch to said operating member, stops for limiting the movement of said switch, a pivoted lever, a switch operated thereby, an over-center spring, an element, one end of said spring being connected to said lever, the other end being connected to said element, and means connecting said element to said operating member.

6. A switch mechanism comprising in combination, a condition responsive device, an operating member connected thereto, a first switch, slip friction means connecting said switch to said operating member, stops for limiting the movement of said switch, a pivoted lever, an over-center spring for producing snap action of said lever, an element, one end of said spring being connected to said lever, the other end being connected to said element, and slip friction means connecting said element to said operating member, the movement of the operating element necessary to cause said spring to snap being greater than that necessary to cause movement of said first switch over it entire range of movement.

7. A switch mechanism comprising in combination, a condition responsive device, an operating member connected thereto, a first switch, slip friction means connecting said switch to said operating member, stops for limiting the movement of said switch, a pivoted lever, a switch operated thereby, an over-center spring, an element, one end of said spring being connected to said lever, the other end being connected to said element, means connecting said element to said operating member, and means on said lever for operating a third switch.

8. A switch mechanism comprising in combination, a condition responsive device, an operating member connected thereto, a first switch, slip friction means connecting said switch to said operating member, stops for limiting the movement of said switch, a pivoted lever, a switch operated thereby, an over-center spring, an element, one end of said spring being connected to said lever, the other end being connected to said element, and means connecting said element to said operating member, a stationary contact, a movable contact, resilient means normally holding the movable contact away from said stationary contact, a projection on said resilient means, and a cam mounted on said lever for engaging said projection to close said contacts when said lever is snapped in one direction, and for disengaging said projection to allow said contacts to separate as said lever is snapped in the other direction.

9. A switch mechanism comprising in combination, a condition responsive device, an operating member connected thereto, a supporting plate, a hole in said plate, one end of said operating member extending through said hole, a bracket secured to said plate around said one end of said operating member, a first lever pivoted to said bracket and having a resiliently mounted contact at its free end, a stationary contact for cooperation therewith mounted on said plate, slip friction means connecting said first lever with said operating member, a stop on said first lever for limiting its rotation in contact opening direction, a second lever pivoted on said bracket, an element, an over-center spring for snapping said second lever back and forth, one end of said spring being connected to said second lever and the other end being connected to said element, slip friction means connecting said element to said operating member, and switch means operated by said second lever.

10. A switch mechanism comprising in combination, a condition responsive device, an operating member connected thereto, a supporting plate, a hole in said plate, one end of said operating member extending through said hole, a bracket secured to said plate around said one end of said operating member, a first lever pivoted to said bracket and having a resiliently mounted contact at its free end, a stationary contact for cooperation therewith mounted on said plate, slip friction means connecting said first lever with said operating member, a stop on said first lever for limiting its rotation in contact opening direction, a second lever pivoted on said bracket, an element, an over-center spring for snapping said second lever back and forth, one end of said spring being connected to said second lever and the other end being connected to said element, slip friction means connecting said element to said operating member, a resiliently mounted contact carried by said second lever, a stationary contact mounted on said plate for cooperation therewith, and another switch operated by said second lever.

11. A switch mechanism comprising in combination, a condition responsive device, an operating member connected thereto, a supporting plate, a hole in said plate, one end of said operating member extending through said hole, a bracket secured to said plate around said one end of said operating member, a first lever pivoted to said bracket and having a resiliently mounted contact at its free end, a stationary contact for cooperation therewith mounted on said plate, slip friction means connecting said first lever with said operating member, a stop on said first lever for limiting its rotation in contact opening direction, a second lever pivoted on said bracket, an element, an over-center spring for snapping said second lever back and forth, one end of said spring being connected to said second lever and the other end being connected to said element, slip friction means connecting said element to said operating member, a resiliently mounted contact carried by said second lever, a stationary contact mounted on said plate for cooperation therewith, another stationary contact mounted on said plate, a resilient arm mounted on said plate, a movable contact carried by said resilient arm and normally in spaced relation with said last named stationary contact, a roller carried by said resilient arm, and a cam carried by said second lever and adapted to contact said roller and close said contacts as said second lever is snapped in one direction.

12. A switch mechanism comprising in combination, a condition responsive device, an operating member connected thereto, a switch operating lever, a first switch operated thereby, slip friction means connecting said lever to said operating member, stops for limiting the movement of said lever, a snap action element, a second switch operated thereby, slip friction means connecting said element to said operating member, the movement of the operating member necessary to cause snapping of said snap action element being greater than that necessary to cause said lever to operate over its entire range whereby said first switch is always actuated before said second switch regardless of the direction of condition change.

13. A switch mechanism comprising in combination, a condition responsive device, an operating member connected thereto, a switch operating lever, a first switch operated thereby, slip friction means connecting said lever to said operating member, stops for limiting the movement of said lever, a snap action element, second and third switches operated thereby, slip friction means connecting said element to said operating member, the movement of the operating member necessary to cause snapping of said snap action element being greater than that necessary to cause said lever to operate over its entire range whereby on an increase in the value of the condition the first switch is closed first and then the second and third switches are opened, and on a decrease in the value of the condition the first switch is opened first and then the second and third switches are closed.

14. A mechanism of the class described, comprising in combination, a rod, means for longitudinally moving said rod, two friction elements, one located on one side of said rod and the other located on the other side of said rod, spring means for holding said friction elements in engagement with said rod whereby said elements may be moved longitudinally by said rod, and stops for limiting the movement of said elements by said rod, said elements being capable of independent frictional movement on said rod.

15. A mechanism of the class described, comprising in combination, a rod, means for longitudinally moving said rod, two friction elements, one located on one side of said rod and the other located on the other side of said rod, spring means for holding said friction elements in engagement with said rod whereby said elements may be moved longitudinally by said rod, a movable member connected to one friction element, a contact carried by said movable member, a stationary contact, engagement of said stationary and movable contacts limiting the movement of said one friction element in one direction, a stop limiting the movement of said one friction element in the other direction, and a switch actuated by said other friction element.

16. A mechanism of the class described, comprising in combination, a rod, means for longitudinally moving said rod, two friction elements, one located on one side of said rod and the other located on the other side of said rod, spring means for holding said friction elements in engagement with said rod whereby said elements may be moved longitudinally by said rod, a movable member connected to one friction element, a contact carried by said movable member, a stationary contact, engagement of said stationary and movable contacts limiting the movement of said one friction element in one direction, a stop limiting the movement of said one friction element in the other direction, a second movable element connected to the other friction element, a contact carried by said second movable element, a second stationary contact, engagement of said last named contacts limiting the movement of said other friction element in one direction, and a stop for limiting the movement of said other friction element in the other direction, the stops being so arranged that said one friction element is limited to a smaller movement than said other.

17. A mechanism of the class described, comprising in combination, a rod, means for longitudinally moving said rod, two friction elements, one located on one side of said rod and the other located on the other side of said rod, spring means for holding said friction elements in engagement with said rod whereby said elements may be moved longitudinally by said rod, a movable member connected to one friction element, a contact carried by said movable member, a stationary contact, engagement of said stationary and movable contacts limiting the movement of said one friction element in one direction, a stop limiting the movement of said one friction element in the other direction, a second movable element connected to the other friction element, a contact carried by said second movable element, a second stationary contact, engagement of said last named contacts limiting the movement of said other friction element in one direction, a stop for limiting the movement of said other friction element in the other direction, the stops being so arranged that said one friction element is limited to a smaller movement than said other whereby the switch formed by the first two contacts is always actuated before the switch actuated by the second two contacts, and a third switch controlled by said other friction element.

ERNEST M. MILLER.